United States Patent
Yueh

(10) Patent No.: US 12,306,417 B2
(45) Date of Patent: *May 20, 2025

(54) ELECTRONIC DEVICE

(71) Applicant: InnoLux Corporation, Miao-Li County (TW)

(72) Inventor: Jui-Jen Yueh, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,587

(22) Filed: Mar. 5, 2024

(65) Prior Publication Data

US 2024/0210717 A1 Jun. 27, 2024

Related U.S. Application Data

(63) Continuation of application No. 18/197,119, filed on May 15, 2023, now Pat. No. 11,947,131, which is a continuation of application No. 17/468,698, filed on Sep. 8, 2021, now Pat. No. 11,686,949.

(30) Foreign Application Priority Data

Oct. 12, 2020 (CN) .......................... 202011085290.6

(51) Int. Cl.
G02B 27/30 (2006.01)
G02B 5/00 (2006.01)

(52) U.S. Cl.
CPC .................................... G02B 27/30 (2013.01)

(58) Field of Classification Search
CPC ................................ G02B 27/30; G02B 5/003
See application file for complete search history.

(56) References Cited

U.S. PATENT DOCUMENTS

| 11,686,949 B2 * | 6/2023 | Yueh | ...................... G02B 27/30 |
| | | | 359/629 |
| 11,947,131 B2 * | 4/2024 | Yueh | ...................... G02B 27/30 |
| 2017/0010516 A1 * | 1/2017 | Shiota | ............... G02F 1/133512 |

* cited by examiner

*Primary Examiner* — Ryan D Howard
(74) *Attorney, Agent, or Firm* — Winston Hsu

(57) ABSTRACT

An electronic device includes a light emitting unit and a light controlling means. The light controlling means is disposed on the light emitting unit, wherein an included angle of an emitting light of the light emitting unit which at least passes through the light controlling means along a horizontal direction is greater than an included angle of the emitting light of the light emitting unit which at least passes through the light controlling means along a vertical direction. The horizontal direction is defined as a direction parallel to a floor and the vertical direction is defined as a direction perpendicular to the floor.

6 Claims, 11 Drawing Sheets

ELECTRONIC DEVICE

CROSS REFERENCE TO RELATED APPLICATIONS

This application is a continuation application of U.S. application Ser. No. 18/197,119, filed on May 15, 2023, which is a continuation application of U.S. application Ser. No. 17/468,698, filed on Sep. 8, 2021. The contents of these applications are incorporated herein by reference.

BACKGROUND OF THE DISCLOSURE

1. Field of the Disclosure

The present disclosure relates to an electronic device (a display device), and more particularly to an electronic device capable of controlling a route that a light moves.

2. Description of the Prior Art

As the evolution and development of electronic devices, the electronic devices have become an indispensable item. The electronic devices such as display devices can provide more convenient information transmission or image display. However, in order to enhance the privacy when viewing the display device and/or to prevent specific persons from viewing the display device for increasing safety (e.g., prevent the driver from watching at least a portion of the display device of the car while driving, and/or prevent the lights emitted by the display device of the car from being projected on the windshield to interfere with the driver), the display device needs to have the function of controlling the route that the light emitted by the display device moves (i.e., the light route).

SUMMARY OF THE DISCLOSURE

According to an embodiment, the present disclosure provides an electronic device including a light emitting unit and a light controlling means. The light controlling means is disposed on the light emitting unit, wherein an included angle of an emitting light of the light emitting unit which at least passes through the light controlling means along a horizontal direction is greater than an included angle of the emitting light of the light emitting unit which at least passes through the light controlling means along a vertical direction. The horizontal direction is defined as a direction parallel to a floor and the vertical direction is defined as a direction perpendicular to the floor.

DETAILED DESCRIPTION

Figure 1:
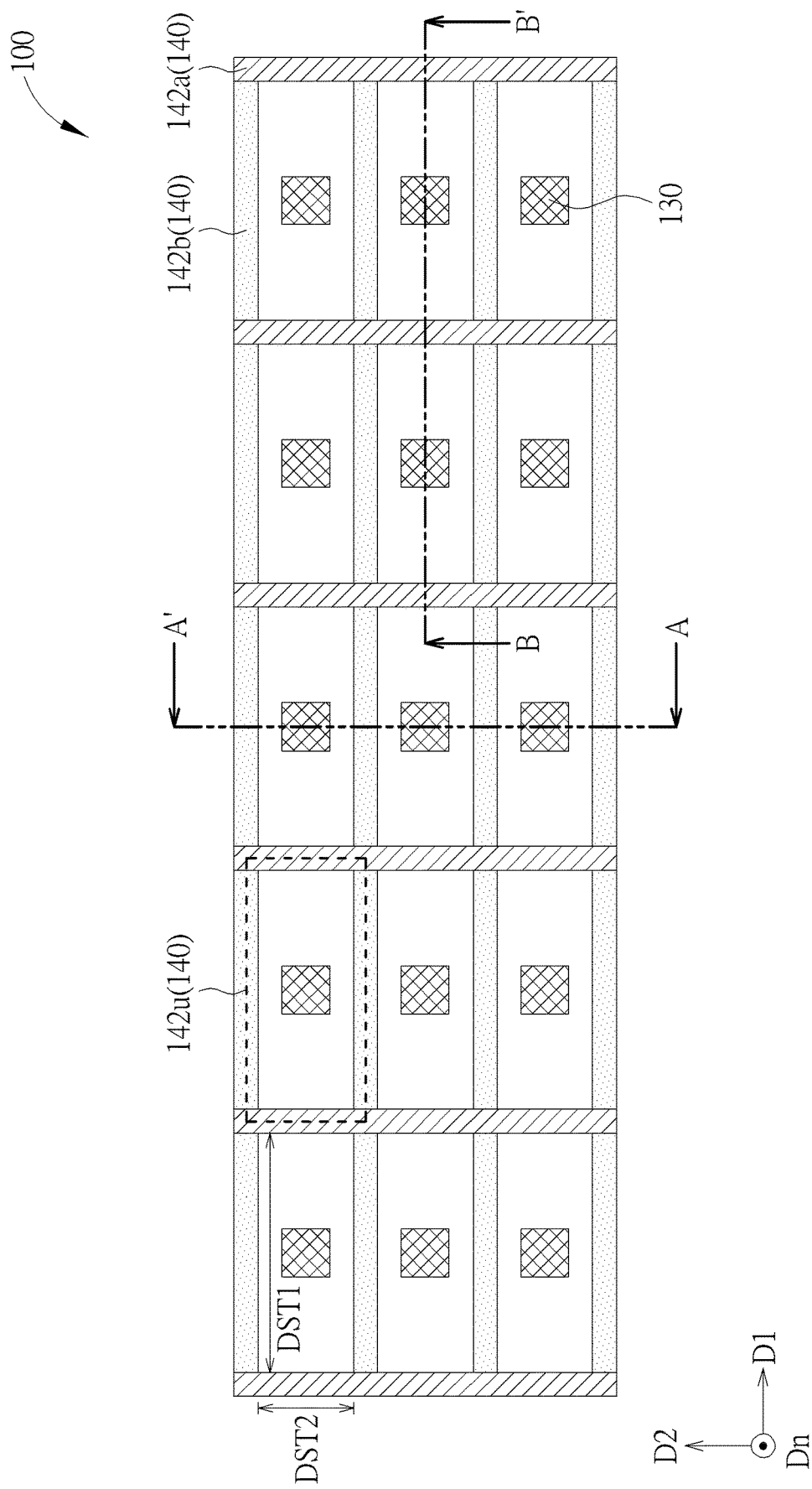
FIG. 1 is a schematic diagram showing a top view of a display device according to some embodiments of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of a display device in this disclosure, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to "on another component", it may be directly on this another component, or other component(s) may exist between them. On the other hand, when the component is referred to "directly on another component (or the variant thereof)", any component does not exist between them. Furthermore, when the corresponding component is referred to "on another component", the corresponding component and the another component have a disposition relationship along a top-view/vertical direction, the corresponding component may be below or above the another component, and the disposition relationship along the top-view/vertical direction are determined by an orientation of the device.

It will be understood that when a component or layer is referred to as being "connected to" another component or layer, it can be directly connected to this another component or layer, or intervening components or layers may be presented. In contrast, when a component is referred to as being "directly connected to" another component or layer, there are no intervening components or layers presented. In addition, when the component is referred to "be coupled to/with another component (or the variant thereof)", it may be directly connected to this another component, or may be indirectly connected (such as electrically connected) to this another component through other component(s).

The terms "about", "substantially", "equal", or "same" generally mean within 20% of a given value or range, or mean within 10%, 5%, 3%, 2%, 1%, or 0.5% of a given value or range.

Although terms such as first, second, third, etc., may be used to describe diverse constituent elements, such constituent elements are not limited by the terms. These terms are used only to discriminate a constituent element from other constituent elements in the specification, and these terms have no relation to the manufacturing order of these constituent components. Claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

In the present disclosure, the display device includes a display function, and the display device may optionally a sensing function, a touch sensing function, an antenna function, other suitable functions or a combination thereof, but not limited thereto. In some embodiments, the display device may include a tiled device, but not limited thereto. The light emitting device may include liquid crystal (LC) molecules, an organic light-emitting diode (OLED), an inorganic light-emitting diode (LED) such as a micro-LED and/or a mini-LED, quantum dots (QDs) material, a quantum-dot light-emitting diode (QLED, QDLED), fluorescence material, phosphor material, other suitable materials or a combination thereof, but not limited thereto. Moreover, the display device may be a color display device or a monochrome display device, and a shape of the display device may be a rectangle, a circle, a polygon, a shape having a curved edge or other suitable shapes, but not limited thereto. In the following, in order to explain exemplarily, the display device is a color display device having light-emitting diodes (e.g., organic light-emitting diodes, inorganic light-emitting diodes or quantum-dot light-emitting diodes) as an example, but the display device is not limited thereto. In some embodiments, the display device may be a display device including a liquid crystal panel or may be other suitable display devices.

The display device may include a plurality of pixels, and the pixel may include at least one sub-pixel. In some embodiments, if the display device is a color display device, one pixel may include three sub-pixels for instance, such as a green sub-pixel, a red sub-pixel and a blue sub-pixel, but not limited thereto. The number and color of the sub-pixel(s) included in the pixel may be adjusted based on requirement(s). In some embodiments, if the display device is a monochrome display device, one pixel may only include one sub-pixel for instance, but not limited thereto. The number of the pixels, the arrangement of the pixels, the number of the sub-pixels and the arrangement of the sub-pixels may be adjusted based on requirement(s). For example, the sub-pixels may be arranged in matrix, stripe type, staggered type or any other suitable arrangements. In addition, the top-view shape of a light emitting portion of the sub-pixel may be a rectangle, a parallelogram, a chevron, a shape having a curved edge or other suitable shapes. The top-view shape of the light emitting portion of the sub-pixel may be determined by an opening of a light shielding layer.

Figure 2:
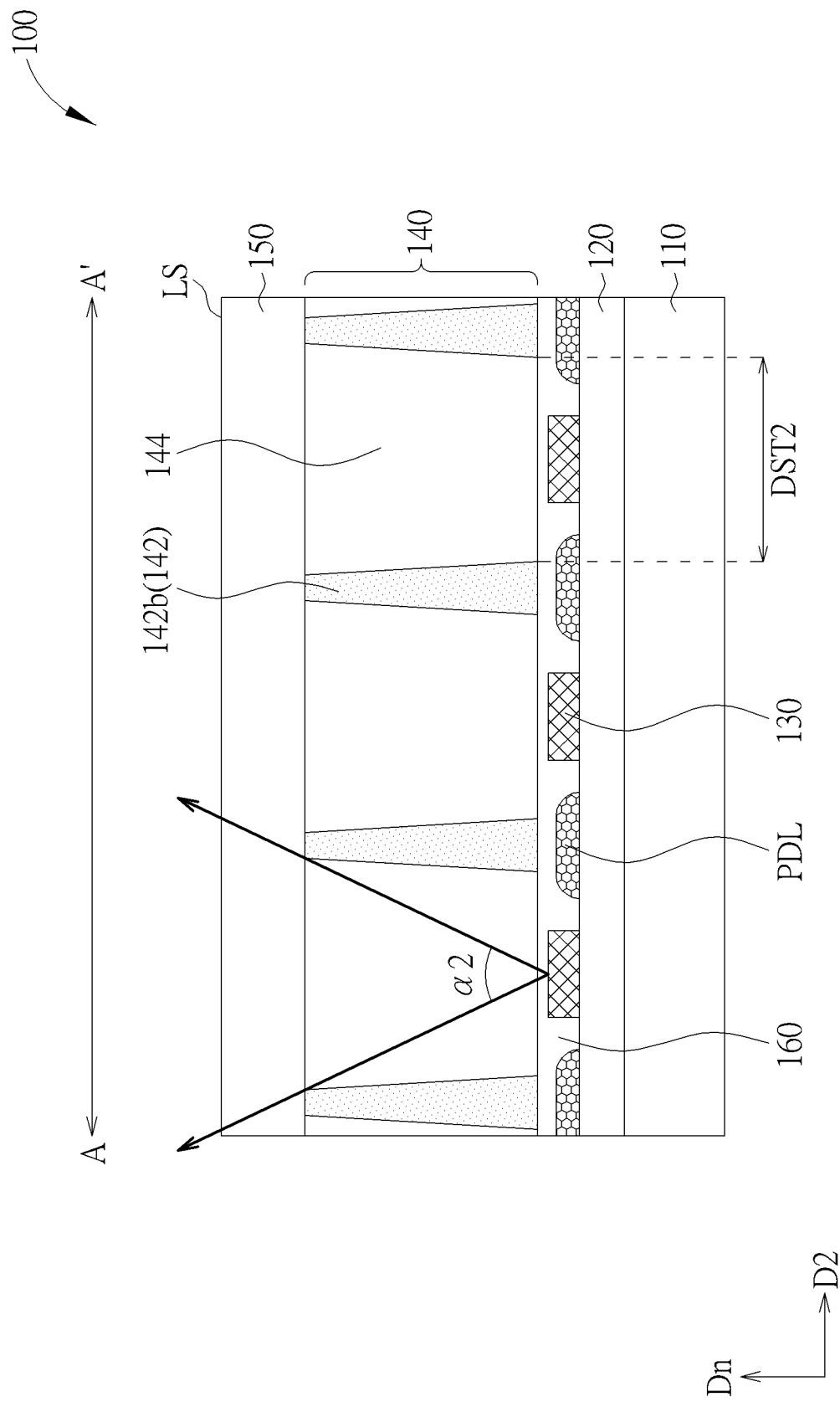
FIG. 2 is a schematic diagram showing a cross-sectional view of the display device taken along a cross-sectional line A-A' in FIG. 1.
Figure 3:
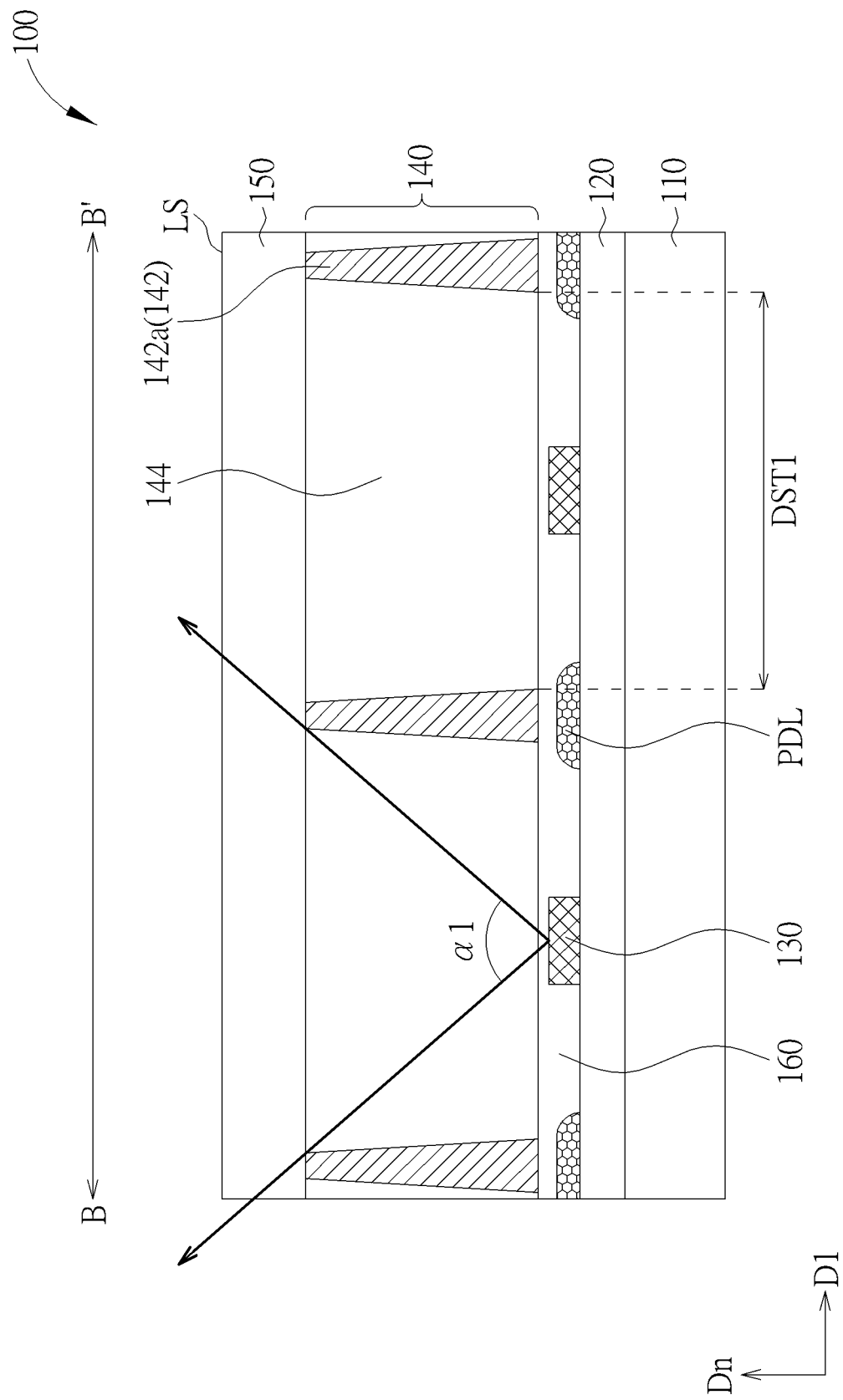
FIG. 3 is a schematic diagram showing a cross-sectional view of the display device taken along a cross-sectional line B-B' in FIG. 1.

Referring to FIG. 1 to FIG. 3, FIG. 1 is a schematic diagram showing a top view of a display device according to some embodiments of the present disclosure, FIG. 2 is a schematic diagram showing a cross-sectional view of the display device taken along a cross-sectional line A-A' in FIG. 1, and FIG. 3 is a schematic diagram showing a cross-sectional view of the display device taken along a cross-sectional line B-B' in FIG. 1. As shown in FIG. 1 to FIG. 3, the display device 100 of this embodiment includes a substrate 110, a circuit component layer 120, a light emitting unit 130 and a light controlling means 140, wherein the circuit component layer 120, the light emitting unit 130 and the light controlling means 140 are disposed on the same side of the substrate 110. Note that the number of the light emitting units 130 is not limited to the number shown in FIG. 1, and the actual number of light-emitting units 130 included in the display device 100 may be less or more. The substrate 110 may include glass, quartz, sapphire, polyimide (PI), polyethylene terephthalate (PET), other suitable materials or a combination thereof, so as to be a rigid substrate or a flexible substrate, but not limited thereto.

The display device 100 of the present disclosure may optionally include a protecting cover layer 150 configured to protecting the structure(s) and/or film(s) which are in the display device 100 and under the protecting cover layer 150. In some embodiments (as shown in FIG. 2 and FIG. 3), the circuit component layer 120, the light emitting unit 130 and the light controlling means 140 are between the substrate 110 and the protecting cover layer 150. The material of the protecting cover layer 150 may be any suitable material, such as silicon oxide ($SiO_x$), silicon nitride ($SiN_y$), silicon oxynitride ($SiO_xN_y$), glass, quartz, sapphire, PI, PET, other suitable materials or a combination thereof, so as to be a rigid layer or a flexible layer. In some embodiments, the protecting cover layer 150 may be an opposite substrate opposite to the substrate 110. Note that the display device 100 has a light-emitting surface LS, the light-emitting surface LS is an outermost surface which the light provided by the display device 100 passes through. For example, in FIG. 2 and FIG. 3, the light-emitting surface LS may be an outer surface of the protecting cover layer 150, but not limited thereto.

The circuit component layer 120 is disposed on the substrate 110, and the circuit component layer 120 may include suitable component(s) and/or suitable structure(s) according to the function included in the display device 100. For example, the circuit component layer 120 may include switching component(s), capacitor(s), scan line(s), data line(s), driving circuit(s) (e.g., a gate driving circuit), other suitable component(s) and/or structure(s), or a combination thereof. In some embodiments, the circuit component layer 120 may include at least one conductive layer, at least one insulating layer, at least one semiconductor layer, other suitable layer(s) or a combination thereof. The material of the conductive layer may include metal, transparent conductive material (such as indium tin oxide (ITO), indium zinc oxide (IZO), etc.), other suitable conductive materials or a combination thereof, the material of the insulating layer may include such as silicon oxide ($SiO_x$), silicon nitride ($SiN_y$), silicon oxynitride ($SiO_xN_y$), other suitable insulating materials or a combination thereof, and the material of the semiconductor layer may include such as poly-silicon, amorphous silicon, metal-oxide semiconductor (IGZO), other suitable semiconductor materials or a combination thereof, but not limited thereto.

The forming method of the circuit component layer 120 may be adjusted based on requirement(s). For instance, the film(s) in the circuit component layer 120 may be formed by a semiconductor process (e.g., a deposition process, a coating process, an etch process and/or a photolithography), but not limited thereto.

The light emitting unit 130 is disposed on the circuit component layer 120 and electrically connected to some components in the circuit component layer 120. The light emitting unit 130 may provide the light having the corresponding light-intensity based on the voltage and/or the current provided by the circuit component layer 120, and the voltage and/or the current provided by the circuit component layer 120 is related to signal(s) provided by an integrated chip or a signal(s) from outside (e.g., gray level signal(s)), thereby displaying an image. Namely, the intensity of the light generated by the light emitting unit 130 is related to the gray level of a region of the display image corresponding to this light-emitting unit 130. In the circuit component layer 120 of some embodiments, the scan line may be configured to transmit switching signal(s) for turning on or turning off the of the switching component, the data line may be configured to transmit the gray level signal(s), the capacitor may improve the stability of the light intensity provided by the light emitting unit 130. For example, the display device 100 may drive the light emitting unit 130 by including a circuit having four switching components and two capacitors (i.e., a 4T2C circuit), including a circuit having seven switching components and one capacitor (i.e., a 7T1C circuit) or including other suitable circuits.

In the present disclosure, each light emitting unit 130 may be one of the sub-pixels of the display device 100, or each light emitting unit 130 may be contained in one of the sub-pixels of the display device 100 to be a part of the sub-pixel. For instance, in some embodiments, if the display device 100 belongs to self-luminous type and includes a self-luminous type light emitting component (e.g., but not limited to, OLED, inorganic LED or QLED), and each sub-pixel may include at least one self-luminous type light emitting component, each light emitting unit 130 may be one or more the self-luminous type light emitting component(s) contained in one sub-pixel. In this case, the circuit component layer 120 may correspondingly provide suitable voltage and/or current for the light emitting unit 130 according to such as the gray level signal provided from the integrated chip or the outer device, such that the light emitting unit 130 may directly generate the light with the corresponding light intensity based on the gray level signal, but not limited thereto. For instance, in some embodiments, if the display device 100 belongs to non-self-luminous type (e.g., but not limited to, a liquid crystal display device) and includes a backlight module and a display medium layer (e.g., but not limited to, a liquid crystal layer), the light emitting unit 130 may include a portion of the backlight module (e.g., a light source and a related optical component). In this case, the circuit component layer 120 may provide backlight display signal(s) and power (from the integrated chip or the outer device) for the light emitting unit 130, such that the light emitting unit 130 provides the light with the corresponding light intensity. In some embodiments, a function layer including a pixel electrode and/or a common electrode, display data line, a switching component, etc. (not shown in figures) may be disposed between the backlight module and the display medium layer, such that the function layer may adjust the transmittance and/or the transparency of the display medium layer. Thus, the light having the desire gray level is generated by the light emitting unit 130 and the function layer.

In some embodiments, the color of the light emitting from the light emitting unit 130 may be designed based on requirement(s). For example, the light emitting units 130 may respectively emit the light with different colors based on the sub-pixels where they are located, such as red light, green light or blue light, but not limited thereto. In some embodiments, all of the light emitting units 130 may emit the light with the same color, and the display device 100 may further include a light converting layer (not shown in figures) disposed on the light emitting unit 130, so as to make the light emitted from the light emitting unit 130 be converted (or filtered) into the light with another color, wherein the light converting layer may be disposed at any suitable position between the light-emitting surface LS and the light emitting unit 130 of the display device 100. The light converting layer may include color filter, quantum dots (QD) material, fluorescence material, phosphorescence material, other suitable materials or a combination thereof. For example, the light emitting unit 130 may emit the white light, and the light converting layer may convert the white light into the light with the color which the sub-pixel needs, such as red light, green light or blue light, but not limited thereto. For example, the light emitting unit 130 may emit the blue light, and the light converting layer may convert the blue light into the light with the color which the sub-pixel needs, such as red light, green light or unconverted blue light, but not limited thereto.

The forming method of the light emitting unit 130 may be adjusted based on requirement(s) and/or the type of the light emitting unit 130. In some embodiments, the forming method of the light emitting unit 130 (e.g., OLED, inorganic LED, QLED, the sub-pixel of the non-self-luminous type display device) may be formed by a semiconductor process including such as a deposition process, a coating process, an etch process and/or a photolithography, but not limited thereto. In some embodiments, the light emitting unit 130 (e.g., inorganic LED) may be disposed on the circuit component layer 120 by a bonding process for example, but not limited thereto.

In addition, in FIG. 2 and FIG. 3, the display device 100 may optionally include a pixel defining layer PDL configured to separate the light emitting units 130 and/or to separate the sub-pixels, wherein the pixel defining layer PDL is disposed on the circuit component layer 120, and the pixel defining layer PDL id between two light emitting units 130 and/or between two sub-pixels. The pixel defining layer PDL may be a single-layer structure or a composite structure, and may include an insulating material, a reflective material, other suitable materials or a combination thereof, but not limited thereto. In addition, in FIG. 2 and FIG. 3, the display device 100 may optionally include the protecting layer 160 disposed on the light emitting unit 130 for protecting the light emitting unit 130. The material of the protecting layer 160 may be any suitable insulating material, such as silicon oxide ($SiO_x$), silicon nitride ($SiN_y$), silicon oxynitride ($SiO_xN_y$), other suitable insulating materials or a combination thereof.

As shown in FIG. 1 to FIG. 3, the light controlling means 140 is disposed on a route that the light emitted from the light emitting unit 130 (hereafter, referred as the emitting light) moves, thereby controlling the route that the emitting light moves. In some embodiments (as shown in FIG. 2 and FIG. 3), a top surface of the light controlling means 140 is higher than a top surface of the light emitting unit 130, so as to control the route that the emitting light moves, but not limited thereto. In some embodiments (as shown in FIG. 2 and FIG. 3), the light controlling means 140 is disposed on the protecting layer 160, such that a bottom surface of the light controlling means 140 is higher than a top surface of the light emitting unit 130, but not limited thereto. In some embodiments (as shown in FIG. 2 and FIG. 3), the light controlling means 140 is disposed on the light emitting unit 130.

In the present disclosure, through the light controlling means 140, the display device 100 controls the emitting light of the light emitting unit 130 to move at a first angle $\theta 1$ in a horizontal direction D1, and controls the emitting light of the light emitting unit 130 to move at a second angle $\theta 2$ in a vertical direction D2, wherein the first angle $\theta 1$ is different from the second angle $\theta 2$. Note that, in FIG. 1 to FIG. 3, the horizontal direction D1 and the vertical direction D2 are perpendicular to a normal direction Dn of the substrate 110 (or a normal direction of the light-emitting surface LS), and the horizontal direction D1 and the vertical direction D2 may be substantially perpendicular to each other, wherein the normal direction Dn of the substrate 110 (or the normal direction of the light-emitting surface LS) of this description is a direction from the light emitting unit 130 to the light-emitting surface LS. In some embodiments, assuming the display device 100 is disposed vertically (i.e., the light-emitting surface LS of the display device 100 is perpendicular to the floor), an included angle between the horizontal direction D1 and the floor may be less than or equal to 10 degrees, and an included angle between the vertical direction D2 and a normal direction of the floor may be less than or equal to 10 degrees. For instance, if the display device 100 is disposed vertically, the horizontal direction D1 may be parallel to the floor, and the vertical direction D2 may be perpendicular to the floor, but not limited thereto. In order to make this description concise and clear, in the following, the normal direction Dn of the substrate 110 may be replaced with the normal direction of the light-emitting surface LS based on actual requirement(s).

The first angle $\theta 1$ and the second angle $\theta 2$ may be obtain by using a luminance measuring instrument MD to measure the luminance of the display device 100. The first angle $\theta 1$ is defined according to the luminance of each angle between a positive direction of the horizontal direction D1 and the normal direction Dn of the substrate 110 (i.e., positive included angle) and the luminance of each angle between a negative direction of the horizontal direction D1 and the normal direction Dn of the substrate 110 (i.e., negative included angle) (hereafter, referred as the luminance between the positive direction and the negative direction of the horizontal direction D1). The second angle $\theta 2$ is defined according to the luminance of each angle between a positive direction of the vertical direction D2 and the normal direction Dn of the substrate 110 (i.e., positive included angle) and the luminance of each angle between a negative direction of the vertical direction D2 and the normal direction Dn of the substrate 110 (i.e., negative included angle) (hereafter, referred as the luminance between the positive direction and the negative direction of the vertical direction D2). That is to say, the first angle $\theta 1$ is an angle on a plane formed by the horizontal direction D1 and the normal direction Dn of the substrate 110, and the second angle $\theta 2$ is an angle on a plane formed by the vertical direction D2 and the normal direction Dn of the substrate 110. In the present disclosure, in the measuring result of the luminance between the positive direction and the negative direction of the horizontal direction D1, a range where the luminance is greater than or equal to 50% of a luminance measured in the normal direction Dn of the substrate 110 (hereafter, referred as a normal emitting luminance Bn) is referred as a first range R1, and an angle range covered by the first range R1 is referred as the first angle $\theta 1$ (i.e., the first angle $\theta 1$ is a difference between a maximum angle and a minimum angle in the first range R1). In the measuring result of the luminance between the positive direction and the negative direction of the vertical direction D2, a range where the luminance is greater than or equal to 50% of the normal emitting luminance Bn is referred as a second range R2, and an angle range covered by the second range R2 is referred as the second angle $\theta 2$ (i.e., the second angle $\theta 2$ is a difference between a maximum angle and a minimum angle in the second range R2). Moreover, in the present disclosure, when the first angle $\theta 1$ is different from the second angle $\theta 2$, a difference between the first angle $\theta 1$ and the second angle $\theta 2$ may be greater than or equal to 5 degrees, but not limited thereto.

In some embodiments, the luminance measuring instrument MD may be a spectroradiometer, a conometer or other suitable instruments. In the following, some embodiments of measuring methods for measuring the first angle $\theta 1$ and the second angle $\theta 2$ by the luminance measuring instrument MD will be described, but the measuring method is not limited to the following embodiments. Any method which can measure the first angle $\theta 1$ and the second angle $\theta 2$ can be regarded as the measuring method of the present disclosure.

Figure 4:
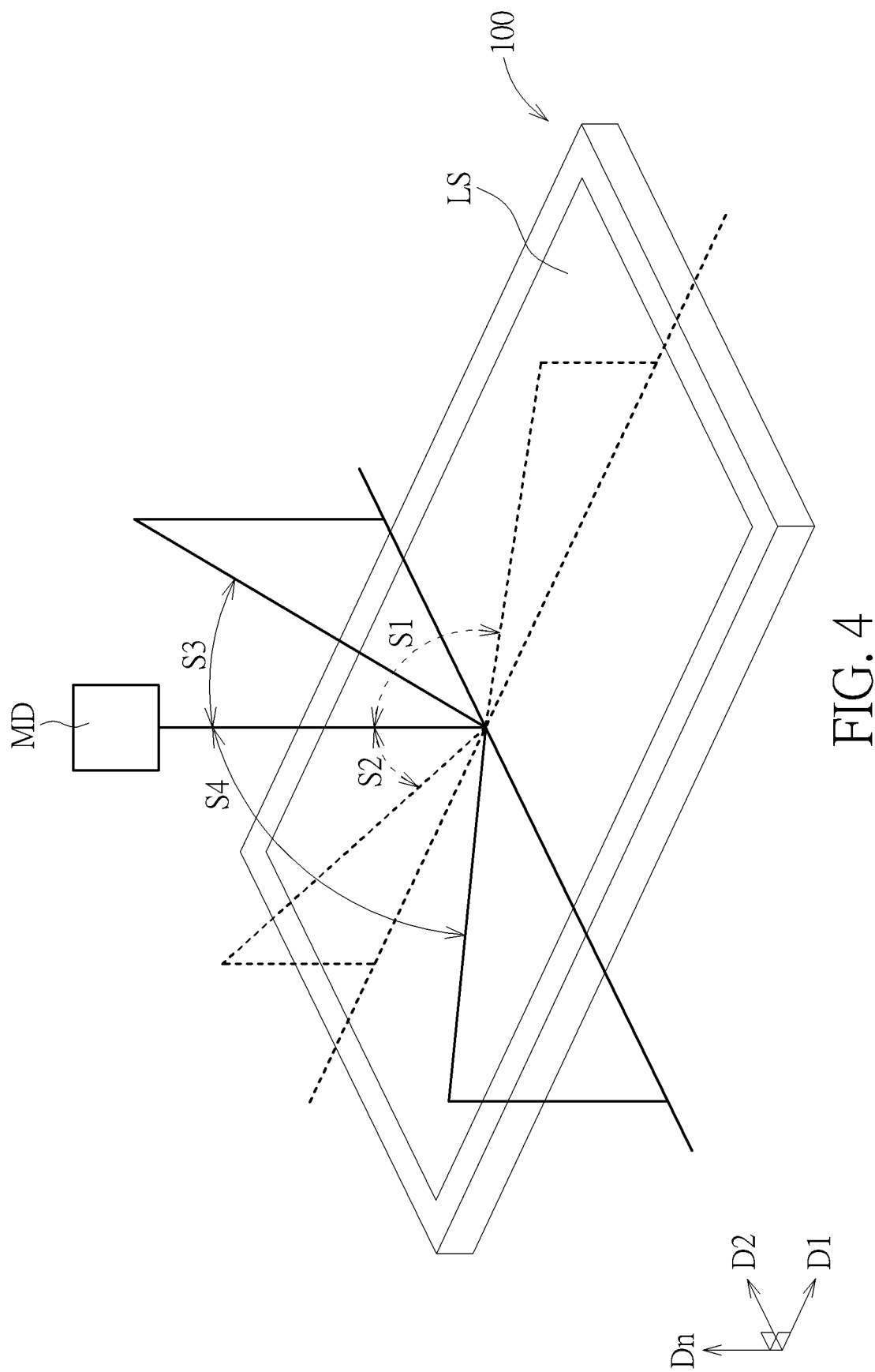
FIG. 4 is a schematic diagram showing a luminance measurement of a display device in a horizontal direction and a vertical direction according to an embodiment of the present disclosure.
Figure 5:
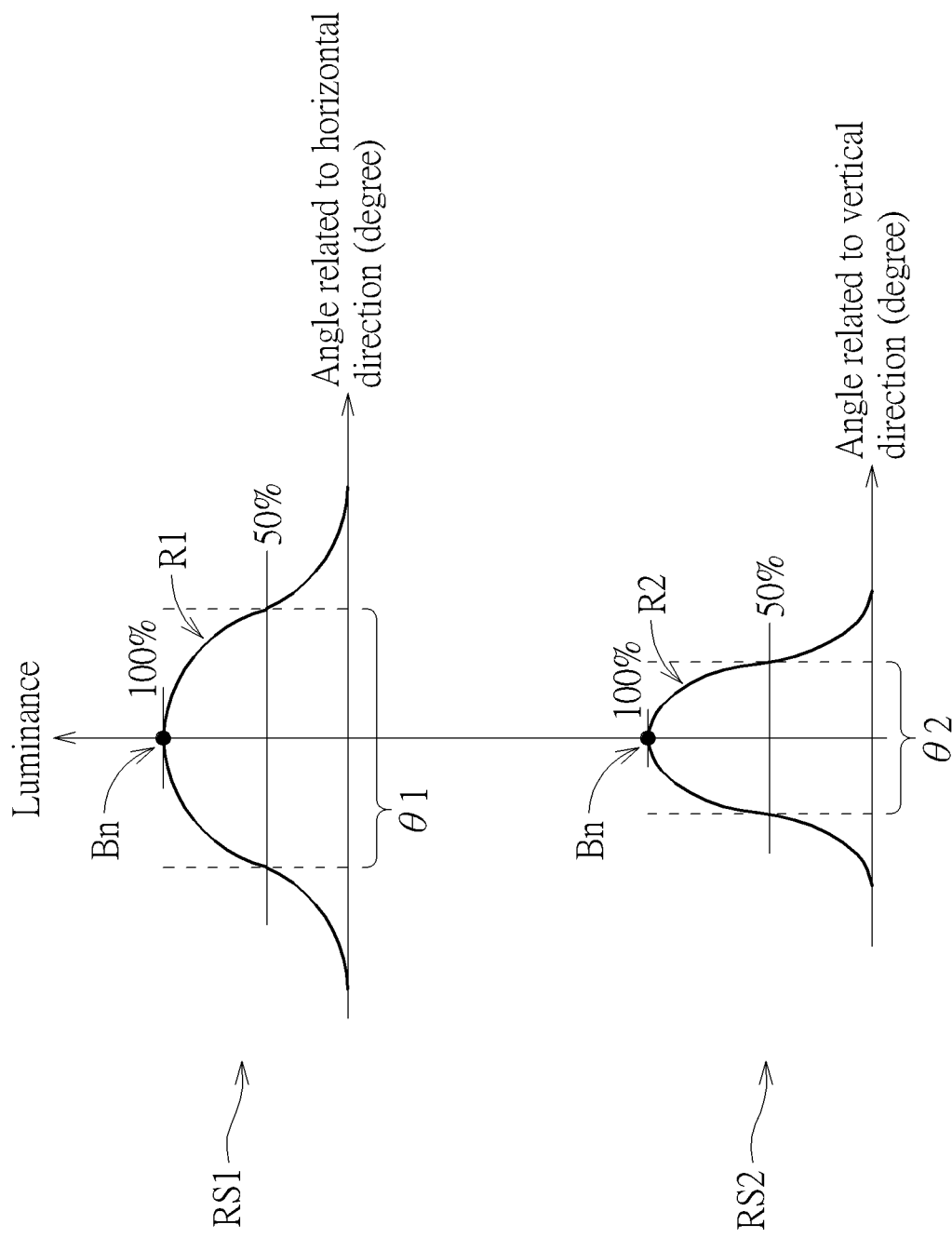
FIG. 5 is a schematic diagram showing a luminance measuring result of a display device in a horizontal direction and a vertical direction according to an embodiment of the present disclosure.
Figure 6:
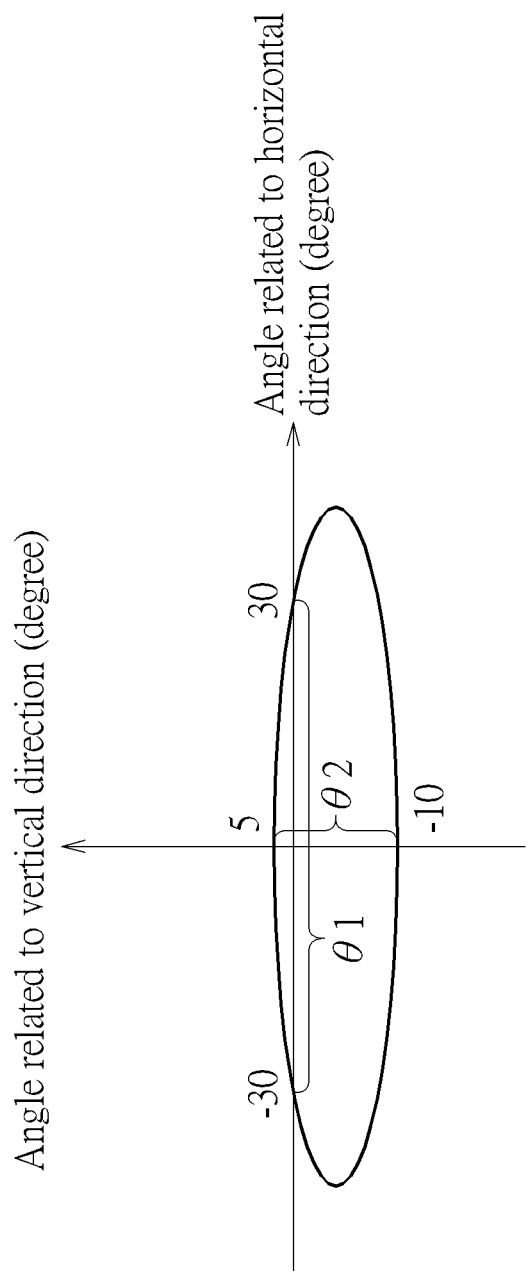
FIG. 6 is a schematic diagram showing a measuring result of a first angle and a second angle of a display device according to an embodiment of the present disclosure.

Referring to FIG. 4 to FIG. 6, FIG. 4 is a schematic diagram showing a luminance measurement of a display device in a horizontal direction and a vertical direction according to an embodiment of the present disclosure, FIG. 5 is a schematic diagram showing a luminance measuring result of a display device in a horizontal direction and a vertical direction according to an embodiment of the present disclosure, and FIG. 6 is a schematic diagram showing a measuring result of a first angle and a second angle of a display device according to an embodiment of the present disclosure. Note that FIG. 4 shows the schematic diagram which the spectroradiometer (e.g., CS-2000T) serves as the luminance measuring instrument MD to measure the luminance of the display device 100, but the measuring method is not limited to FIG. 4. In this measuring method, the display device 100 may turn on a portion of the light emitting units 130 (e.g., the display device 100 may turn on the light emitting units 130 situated at its center region) or all of the light emitting units 130, wherein the turned-on light emitting unit(s) 130 may receive such as a greatest gray level signal (e.g., 255) to emit light, and the turned-off light emitting unit(s) 130 may receive such as a least gray level signal (e.g., 0) or may not receive any gray level signal, but not limited thereto. As shown in FIG. 4, the luminance measuring instrument MD may be disposed on the light-emitting surface LS of the display device 100, and a light receiving part of the luminance measuring instrument MD is towards the light-emitting surface LS. In an embodiment of the measuring method, the light receiving part of the luminance measuring instrument MD is substantially aligned with a center of the turned-on light emitting unit(s) 130, and a line formed between the light receiving part of the luminance measuring instrument MD and the its aligning position is substantially parallel to the normal direction Dn of the substrate 110, thereby measuring the normal emitting luminance Bn of the display device 100 (as shown in FIG. 5). Moreover, in the embodiment shown in FIG. 4, a space may optionally exist between the luminance measuring instrument MD and the aligning position at the light-emitting surface LS aligning with the luminance measuring instrument MD, and this space may have any suitable size. For instance, the space between the luminance measuring instrument MD and the light-emitting surface LS of the display device 100 may be 500 mm, but not limited thereto.

Then, by rotating the display device 100 or by rotating and moving the luminance measuring instrument MD, an included angle between the line formed between the light receiving part of the luminance measuring instrument MD and the its aligning position and the normal direction Dn of the substrate 110 is greater than or less than 0 degrees, thereby measuring the luminance between the positive direction and the negative direction of the horizontal direction D1 (e.g., the luminance measuring instrument MD rotates and moves according to a route S1 and a route S2 shown in FIG. 4) and the luminance between the positive direction and the negative direction of the vertical direction D2 (e.g., the luminance measuring instrument MD rotates and moves according to a route S3 and a route S4 shown in FIG. 4), but not limited thereto. In FIG. 4, the luminance of each angle between the positive direction of the horizontal direction D1 and the normal direction Dn of the substrate 110 may be measured when the luminance measuring instrument MD rotates and moves according to the route S1, and the luminance of each angle between the negative direction of the horizontal direction D1 and the normal direction Dn of the substrate 110 may be measured when the luminance measuring instrument MD rotates and moves according to the route S2, thereby obtaining a luminance measuring result RS1 of the luminance between the positive direction and the negative direction of the horizontal direction D1 shown in FIG. 5 (an upper portion of FIG. 5). Similarly, in FIG. 4, the luminance of each angle between the positive direction of the vertical direction D2 and the normal direction Dn of the substrate 110 may be measured when the luminance measuring instrument MD rotates and moves according to the route S3, and the luminance of each angle between the negative direction of the vertical direction D2 and the normal direction Dn of the substrate 110 may be measured when the luminance measuring instrument MD rotates and moves according to the route S4, thereby obtaining a luminance measuring result RS2 of the luminance between the positive direction and the negative direction of the vertical direction D2 shown in FIG. 5 (an lower portion of FIG. 5).

As shown in FIG. 5, in the luminance measuring result RS1 of the luminance between the positive direction and the negative direction of the horizontal direction D1, the range where the luminance is greater than or equal to 50% of the normal emitting luminance Bn is referred as the first range R1. In the luminance measuring result RS2 of the luminance between the positive direction and the negative direction of the vertical direction D2, the range where the luminance is greater than or equal to 50% of the normal emitting luminance Bn is referred as the second range R2. The difference between a maximum angle and a minimum angle in the first range R1 is the first angle $\theta 1$, and the difference between a maximum angle and a minimum angle in the second range R2 is the second angle $\theta 2$, wherein ±10 degrees of a measurement error range may be tolerated in the value of the angle measured in above. For instance, as shown in FIG. 6, since the maximum angle and the minimum angle in the first range R1 are 30 degrees and −30 degrees respectively, and the maximum angle and the minimum angle in the second range R2 are 5 degrees and −10 degrees respectively, the first angle $\theta 1$ is 60 degrees and the second angle $\theta 2$ is 15 degrees, but the luminance measuring result is not limited to the embodiment shown in FIG. 6.

Moreover, in some embodiments (not shown in figures), the conometer (e.g., USB2000) serves as the luminance measuring instrument MD to measure the luminance of the display device 100. In this case, the light receiving part of this luminance measuring instrument MD may be substantially aligned with the center of the turned-on light emitting unit(s) 130, and this the luminance measuring instrument MD may be directly in contact with the light-emitting surface LS of the display device 100. Furthermore, this luminance measuring instrument MD may measure the luminance of needed view-angle under the condition that this luminance measuring instrument MD does not move and rotate. The first angle $\theta 1$ may be obtained from a view-angle range where the luminance between the positive direction and the negative direction of the horizontal direction D1 is greater or equal to 50% of the normal emitting luminance Bn, and the second angle $\theta 2$ may be obtained from a view-angle range where the luminance between the positive direction and the negative direction of the vertical direction D2 is greater or equal to 50% of the normal emitting luminance Bn, wherein ±10 degrees of a measurement error range may be tolerated in the value of the angle measured in above. The measuring method is not limited to the embodiments described in the present disclosure. Any suitable method which can measure the first angle $\theta 1$ and the second angle $\theta 2$ shall be considered as the measuring method of the present disclosure.

Owing to the design of the light controlling means 140 of the present disclosure, the display device 100 may control the emitting light of the light emitting unit 130 moves at different angles (i.e., the first angle $\theta 1$ and the second angle $\theta 2$) in the horizontal direction D1 and the vertical direction D2 respectively through the light controlling means 140. Some embodiments of the light controlling means are described in the following, but the light controlling means 140 is not limited to the below embodiments. Any component and/or structure which can control the route of the emitting light of the light emitting unit 130 in the horizontal direction D1 and the vertical direction D2 may be considered as the light controlling means 140 of the present disclosure.

As shown in FIG. 1 to FIG. 3, in some embodiments, the light controlling means 140 may be an opaque collimator and include a plurality of collimating walls 142, so as to control the route that the emitting light of the light emitting unit 130 moves by limiting an emitting angle between the emitting light emitting and the light-emitting surface LS, wherein the collimating wall 142 may not overlap the light emitting unit 130 in the normal direction Dn of the substrate 110. For instance, the collimating wall 142 may overlap the pixel defining layer PDL in the normal direction Dn of the substrate 110, but not limited thereto. In some embodiments, the collimating wall 142 of the light controlling means 140 may be a non-adjustable collimator, and the material of the collimating wall 142 may include acrylic resin, epoxy resin, silane, other suitable materials or a combination thereof, but not limited thereto. The color of the light controlling means 140 may be such as black, gray or white or other suitable colors, but not limited thereto.

In order to control the route of the emitting light of the light emitting unit 130 in the horizontal direction D1 and the vertical direction D2, the collimating wall 142 of the light controlling means 140 may include a plurality of first collimating walls 142a and a plurality of second collimating walls 142b, wherein the first collimating walls 142a arrange in the horizontal direction D1 and extend along the vertical direction D2, and the second collimating walls 142b arrange in the vertical direction D2 and extend along the horizontal direction D1. Note that, although the first collimating wall 142a and the second collimating wall 142b shown in the figures are illustrated with different shadings, the material of the first collimating wall 142a and the material of the second collimating wall 142b may be the same or different. In some embodiments (as shown in FIG. 2 and FIG. 3), the height of the first collimating wall 142a and the height of the first collimating wall 142a may be the same, but not limited thereto. The first collimating wall 142a is configured to control the route of the emitting light of the light emitting unit 130 in the horizontal direction D1, and the second collimating wall 142b is configured to control the route of the emitting light of the light emitting unit 130 in the vertical direction D2. In FIG. 1, two adjacent first collimating walls 142a and two adjacent second collimating walls 142b may form an enclosed collimating wall unit 142u (i.e., the light controlling means 140 includes a plurality of collimating wall units 142u), and each collimating wall unit 142u may surround one light emitting unit 130 and/or one sub-pixel, but not limited thereto. In FIG. 1 to FIG. 3, two adjacent first collimating walls 142a are spaced from each other at a first distance DST1 in the horizontal direction D1, and two adjacent second collimating walls 142b are spaced from each other at a second distance DST2 in the vertical direction D2, wherein the first distance DST1 is a minimum distance between two adjacent first collimating walls 142a in the horizontal direction D1 (as shown in FIG. 3), the second distance DST2 is a minimum distance between two adjacent second collimating walls 142b in the vertical direction D2 (as shown in FIG. 2). Note that, since the collimating wall 142 may block the progress of the light, as the distance between two adjacent collimating walls 142 is smaller, the angle between the emitted light that can emit out the light-emitting surface LS and the normal direction Dn of the substrate 110 is smaller, thereby affecting the first angle θ1 related to the horizontal direction D1 and the second angle θ2 related to the vertical direction D2. Accordingly, in order to make the first angle θ1 different from the second angle θ2, the first distance DST1 may be different from the second distance DST2 in one collimating wall unit 142u.

The first distance DST1 between the first collimating walls 142a and the second distance DST2 between the second collimating walls 142b may be designed based on the required first angle θ1 and the required second angle θ2, and the first angle θ1 may be greater than or less than the second angle θ2. In some embodiments (as shown in FIG. 1 to FIG. 3, FIG. 5 and FIG. 6), the first angle θ1 may be greater than the second angle θ2, and therefore, the first distance DST1 may be greater than the second distance DST2 in one collimating wall unit 142u. In detail, as shown in FIG. 1 to FIG. 3, because the first distance DST1 may be greater than the second distance DST2, an included angle α1 of the emitting light of the light emitting unit 130 which can pass through the light-emitting surface LS and be shown in FIG. 3 may be greater than an included angle α2 of the emitting light of the light emitting unit 130 which can pass through the light-emitting surface LS and be shown in FIG. 2. Accordingly, by the measurement of the luminance measuring instrument MD, the first range R1 may be greater than the second range R2, such that the first angle θ1 may be greater than the second angle θ2. For example, the first angle θ1 may be less than or equal to 60 degrees (or less than or equal to 50 degrees), the second angle θ2 may be less than or equal to 35 degrees, but not limited thereto. In some embodiments, the first angle θ1 may be less than the second angle θ2. Note that, the included angle α1 shown in FIG. 3 may be the same as or different from the first angle θ1, and the included angle α2 shown in FIG. 2 may be the same as or different from the second angle θ2.

Under the condition that the aforementioned display device 100 is applied to the display device of the car (for example, the display device 100 may be a center informative display, an instrument panel and/or an in-vehicle infotainment system in the car), since the display device 100 is disposed vertically in the car to make the vertical direction D2 substantially perpendicular to the floor, and the second angle θ2 is less (e.g., less than or equal to 35 degrees), the emitting light of the display device 100 may be prevented from being projected on the windshield, so as to increase safety while driving. Moreover, if the information shown on the display device 100 (e.g., video played on the display device 100 in front of the front passenger) may influence the safety that the driver drives the car, because the aforementioned first angle θ1 may be less than or equal to 60 degrees (or less than or equal to 50 degrees) for example, the chance that the driver sees this display information while driving may be reduced, so as to improve the safety while driving.

In addition, in some embodiments (not shown in figures), different collimating wall units 142u may have different first distances DST1 and/or different second distances DST2. For instance, in some embodiments, the first distances DST1 and/or the second distances DST2 of the collimating wall units 142u arranged in a direction may be gradually change. For example, when the display device 100 applied to the display device which is in front of the front passenger in the car, the first distances DST1 of the collimating wall units 142u arranged in the horizontal direction D1 may be gradually change, and the first distance DST1 of the collimating wall unit 142u increases as the distance between this collimating wall unit 142u and the driver increases, but not limited thereto. Note that, although different collimating wall units 142u may have different first distances DST1 and/or different second distances DST2, in one collimating wall unit 142u, the first distance DST1 may be different from the second distance DST2.

The light controlling means 140 may optionally include a transparent unit 144, and the transparent unit 144 may overlap at least one of the light emitting units 130 in the normal direction Dn of the substrate 110 (e.g., each transparent unit 144 shown in FIG. 1 to FIG. 3 overlap one of the light emitting units 130, but not limited thereto). In FIG. 1 to FIG. 3, the transparent unit 144 may be surrounded by two first collimating walls 142a and two second collimating walls 142b. Namely, the collimating wall unit 142u of the light controlling means 140 surrounds the transparent unit 144, but not limited thereto. The transparent unit 144 may be transparent (or almost transparent), and the emitting light of the light emitting unit 130 may pass through the transparent unit 144 and the light-emitting surface LS in sequence. In some embodiments, the transparent unit 144 may include acrylic resin, epoxy resin, silicone resin, polycarbonate, other suitable transparent materials or a combination thereof.

The forming method of the light controlling means 140 may be designed based on its type and structure. For example, the forming method of the light controlling means 140 shown in FIG. 1 to FIG. 3 may include a deposition process, a coating process, an imprinting process, an etch process and/or a photolithography, but not limited thereto.

Moreover, the display device 100 may optionally include other suitable layer(s) and/or structure(s) based requirement(s). For instance, in some embodiments, the display device 100 may further include an optical layer, such as a polarizer and/or an anti-reflection film, disposed at any suitable position, but not limited thereto. For instance, in some embodiments, the display device 100 may further include a light shielding layer configured to separate the sub-pixels from each other and shield some components, so as to reduce the probability that the external light is reflected by the display device 100, thereby increasing the display quality. Note that, the light controlling means 140 (e.g., the collimator) in some embodiments may have the function and effect of aforementioned light shielding layer.

The display device of the present disclosure is not limited to the above embodiments. Further embodiments of the present disclosure are described below. For ease of comparison, same components will be labeled with the same symbol in the following. The following descriptions relate the differences between each of the embodiments, and repeated parts will not be redundantly described.

Figure 7:
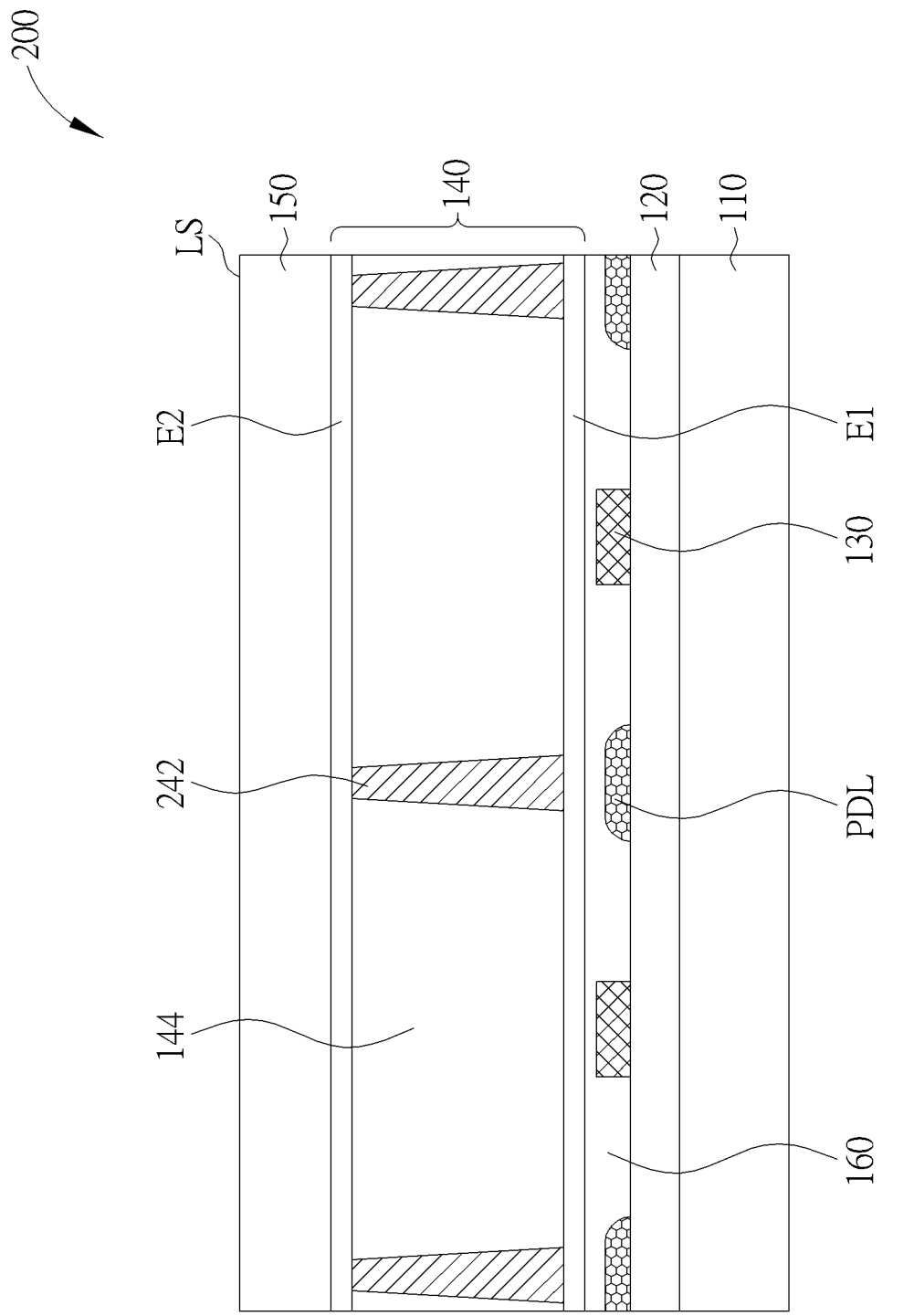
FIG. 7 is a schematic diagram showing a cross-sectional view of a display device according to some embodiments of the present disclosure.
Figure 8:
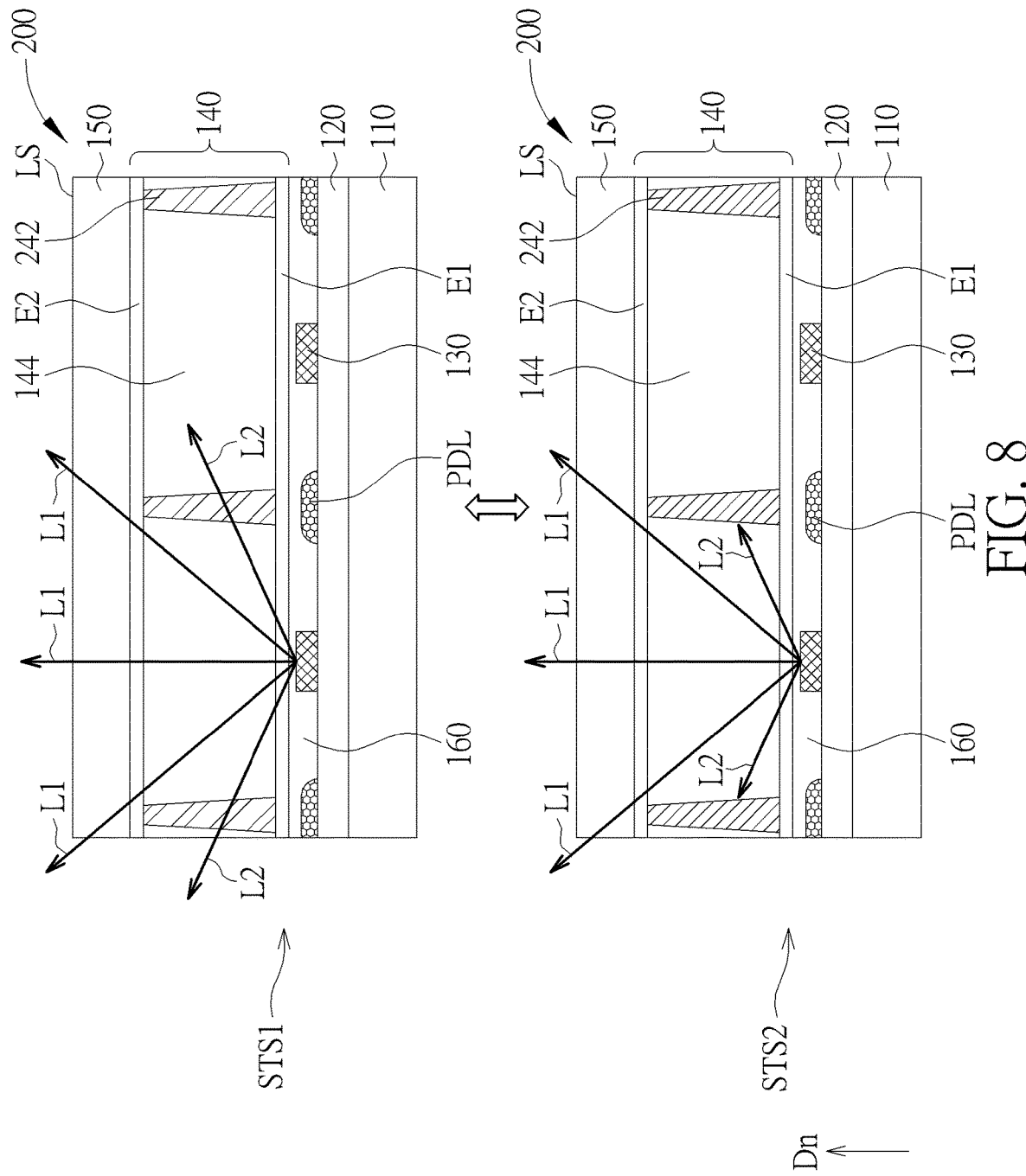
FIG. 8 is a schematic diagram showing a cross-sectional view of a display device in two modes according to some embodiments of the present disclosure.

Referring to FIG. 7 and FIG. 8, FIG. 7 is a schematic diagram showing a cross-sectional view of a display device according to some embodiments of the present disclosure, and FIG. 8 is a schematic diagram showing a cross-sectional view of a display device in two modes according to some embodiments of the present disclosure, wherein FIG. 7 shows a second mode of the display device 200 of some embodiments. The display device 200 of this embodiment may control the transparency of at least a portion of the light controlling means 140 by electrical signal(s). In detail, the collimating wall 142 may be a non-adjustable collimator or an adjustable collimator (e.g., 242). The non-adjustable collimator may be referred to aforementioned embodiment(s), and the material of the non-adjustable collimator may include acrylic resin, epoxy resin, silicone resin, polycarbonate, other suitable material(s) or a combination thereof. The material of the adjustable collimator may include electrochromic material, polymer dispersed liquid crystal material, cholesteric liquid crystal (CLC), colored electrophoretic particle, suspending particle material, other suitable material(s) or a combination thereof.

The light controlling means 140 may be designed to include the adjustable collimator(s) and/or the non-adjustable collimator(s) based on requirement(s). For example, in some embodiments, the first collimating wall 142a is the adjustable collimator 242, and the second collimating wall 142b is the non-adjustable collimator, but not limited thereto. For example, in some embodiments, the first collimating wall 142a is the non-adjustable collimator, and the second collimating wall 142b is the adjustable collimator 242, but not limited thereto. For example, in some embodiments, the first collimating wall 142a and the second collimating wall 142b are the adjustable collimators 242 or the non-adjustable collimators, but not limited thereto.

Furthermore, the light controlling means 140 may further include a first electrode E1 and a second electrode E2, and the adjustable collimator 242 is connected between the first electrode E1 and the second electrode E2. In FIG. 7, the adjustable collimator 242 may be disposed between the first electrode E1 and the second electrode E2 (the first electrode E1 may be disposed between the protecting layer 160 and the adjustable collimator 242, the second electrode E2 may be disposed between the adjustable collimator 242 and the protecting cover layer 150), and the adjustable collimator 242 may be in contact with the first electrode E1 and the second electrode E2, but not limited thereto. The display device 200 may provide the electrical signal(s) for the first electrode E1 and the second electrode E2, and the transparency of the adjustable collimator 242 may be adjusted based on the electrical signal(s) applied on the first electrode E1 and the second electrode E2. In some embodiments, the first electrode E1 and the second electrode E2 may include transparent conductive material, such as indium tin oxide (ITO) and/or indium zinc oxide (IZO), but not limited thereto.

As shown in FIG. 8, the adjustable collimator 242 may have a first mode STS1 and a second mode STS2 according to its transparency, wherein the adjustable collimator 242 in the first mode STS1 is in a light-penetrating status (e.g., the adjustable collimator 242 is transparent and or almost transparent), and the adjustable collimator 242 in the second mode STS2 is in a light-non-penetrating status (e.g., the adjustable collimator 242 is opaque). Note that, in FIG. 8, the adjustable collimator 242 in the first mode STS1 is shown with the sparse slash shading, the adjustable collimator 242 in the second mode STS2 is shown with the dense slash shading. In the first mode STS1 (as shown in FIG. 8), because the adjustable collimator 242 is in the light-penetrating status, the emitting light of the light emitting unit 130 is not blocked by the adjustable collimator 242 substantially. In the first mode STS1 shown in FIG. 8, a portion of the emitting light of the light emitting unit 130 (e.g., the light L1) may pass through the transparent unit 144 and the light-emitting surface LS, and another portion of the emitting light of the light emitting unit 130 (e.g., the light L2) may pass through the transparent unit 144, the adjustable collimator 242 and the light-emitting surface LS. Accordingly, in the first mode STS1, the adjustable collimator 242 does not limit the angle between the emitting light of the light emitting unit 130 and the light-emitting surface LS, such that the adjustable collimator 242 does not control the route of the emitting light of the light emitting unit 130. In the second mode STS2 (as shown in FIG. 8), because the adjustable collimator 242 is in the light-non-penetrating status, a portion of the emitting light of the light emitting unit 130 (e.g., the light L2) is blocked by the adjustable collimator 242. In the second mode STS2 shown in FIG. 8, a portion of the emitting light of the light emitting unit 130 (e.g., the light L1) may pass through the transparent unit 144 and the light-emitting surface LS, and another portion of the emitting light of the light emitting unit 130 (e.g., the light L2) may be blocked by the adjustable collimator 242. Accordingly, in the second mode STS2, the adjustable collimator 242 may limit the angle between the emitting light of the light emitting unit 130 and the light-emitting surface LS, so as to control the route of the emitting light of the light emitting unit 130.

For instance, if the first collimating wall 142a is the adjustable collimator 242, the first collimating wall 142a in the first mode STS1 may not control the route that the emitting light of the light emitting unit 130 moves in the horizontal direction D1, such that the emitting light of the light emitting unit 130 may not be limited to moving at the first angle θ1 in the horizontal direction D1; the first collimating wall 142a in the second mode STS2 may control the route that the emitting light of the light emitting unit 130 moves in the horizontal direction D1, such that the emitting light of the light emitting unit 130 may move at the first angle θ1 in the horizontal direction D1. Similarly, if the second collimating wall 142b is the adjustable collimator 242, the second collimating wall 142b in the first mode STS1 may not control the route that the emitting light of the light emitting unit 130 moves in the vertical direction D2, such that he emitting light of the light emitting unit 130 may not be limited to moving at the second angle θ2 in the vertical direction D2; the second collimating wall 142b in the second mode STS2 may control the route that the emitting light of the light emitting unit 130 moves in the vertical direction D2, such that the emitting light of the light emitting unit 130 may move at the second angle θ2 in the vertical direction D2. Note that the mode of the first collimating wall 142a and the mode of the second collimating wall 142b may be controlled independently and respectively. In some examples of the operation, the first collimating wall 142a and the second collimating wall 142b may be in the first mode STS1 or the second mode STS2 simultaneously. In some examples of the operation, the first collimating wall 142a and the second collimating wall 142b may be in different modes. Moreover, in some examples of the operation, the first collimating wall 142a may be switched between the first mode STS1 and the second mode STS2, and the second collimating wall 142b may be permanently in the second mode STS2, but not limited thereto.

Figure 9:
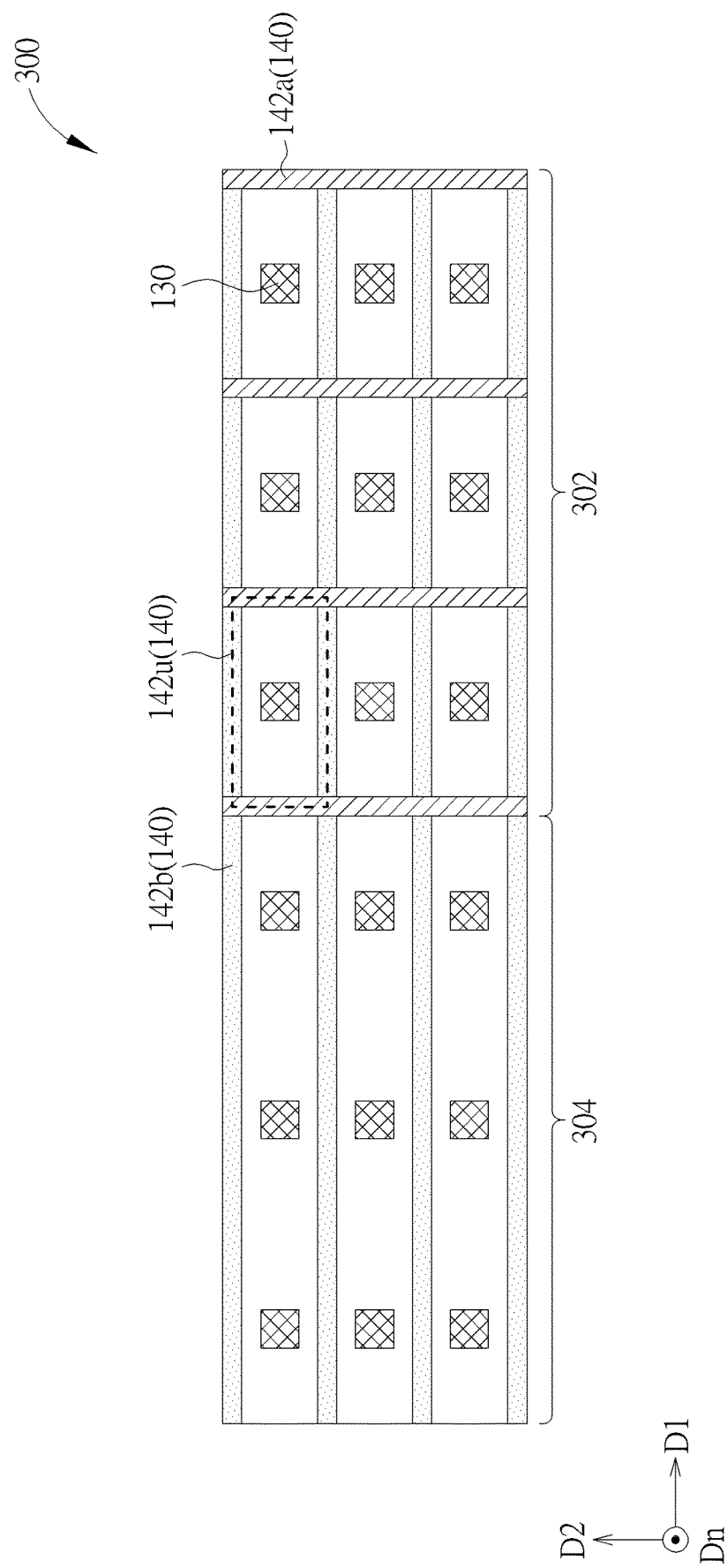
FIG. 9 is a schematic diagram showing a top view of a display device according to some embodiments of the present disclosure.

Referring to FIG. 9, FIG. 9 is a schematic diagram showing a top view of a display device according to some embodiments of the present disclosure. The display device 300 of this embodiment may be divided into a plurality of regions, and the controls of the route of the emitting light of the light emitting unit 130 are different in each region. In some embodiments, the designs of the regions of the light controlling means 140 may be the same or different based on requirement(s). For instance, in the embodiment shown in FIG. 9, the display device 300 may include a first region 302 and a second region 304, the first region 302 of the light controlling means 140 may include a plurality of first collimating walls 142a and a plurality of second collimating walls 142b, the second region 304 of the light controlling means 140 may include a plurality of second collimating walls 142b, and the second region 304 may not include the first collimating wall 142a, but not limited thereto. The control of the route of the emitting light of the light emitting unit 130 caused by the first region 302 shown in FIG. 9 may be the same as (or similar to) the aforementioned embodiment(s), and this will not be redundantly described. In the second region 304 shown in FIG. 9, since the second region 304 does not include the first collimating wall 142a, the second region 304 does not control the route that the emitting light of the light emitting unit 130 moves in the horizontal direction D1, such that the emitting light of the light emitting unit 130 may not be limited to moving at the first angle θ1 in the horizontal direction D1.

In another example, the second region 304 may include a plurality of first collimating walls 142a and a plurality of second collimating walls 142b, but the first collimating walls 142a may be the adjustable collimators (the detail can be referred to aforementioned embodiment(s)), but not limited thereto. In this case, in the second region 304, the first collimating wall 142a in the first mode STS1 does not control the route that the emitting light of the light emitting unit 130 moves in the horizontal direction D1, such that the emitting light of the light emitting unit 130 may not be limited to moving at the first angle θ1 in the horizontal direction D1.

For instance, when the display device 300 shown in FIG. 9 is applied to the display device of the car, the first region 302 of this display device 300 may serve as an infotainment display region in front of the front passenger, and the second region 304 may have the function similar to the center informative display, such that the display device 300 may be a combination of the infotainment display in front of the front passenger and the center informative display, but not limited thereto.

Figure 10:
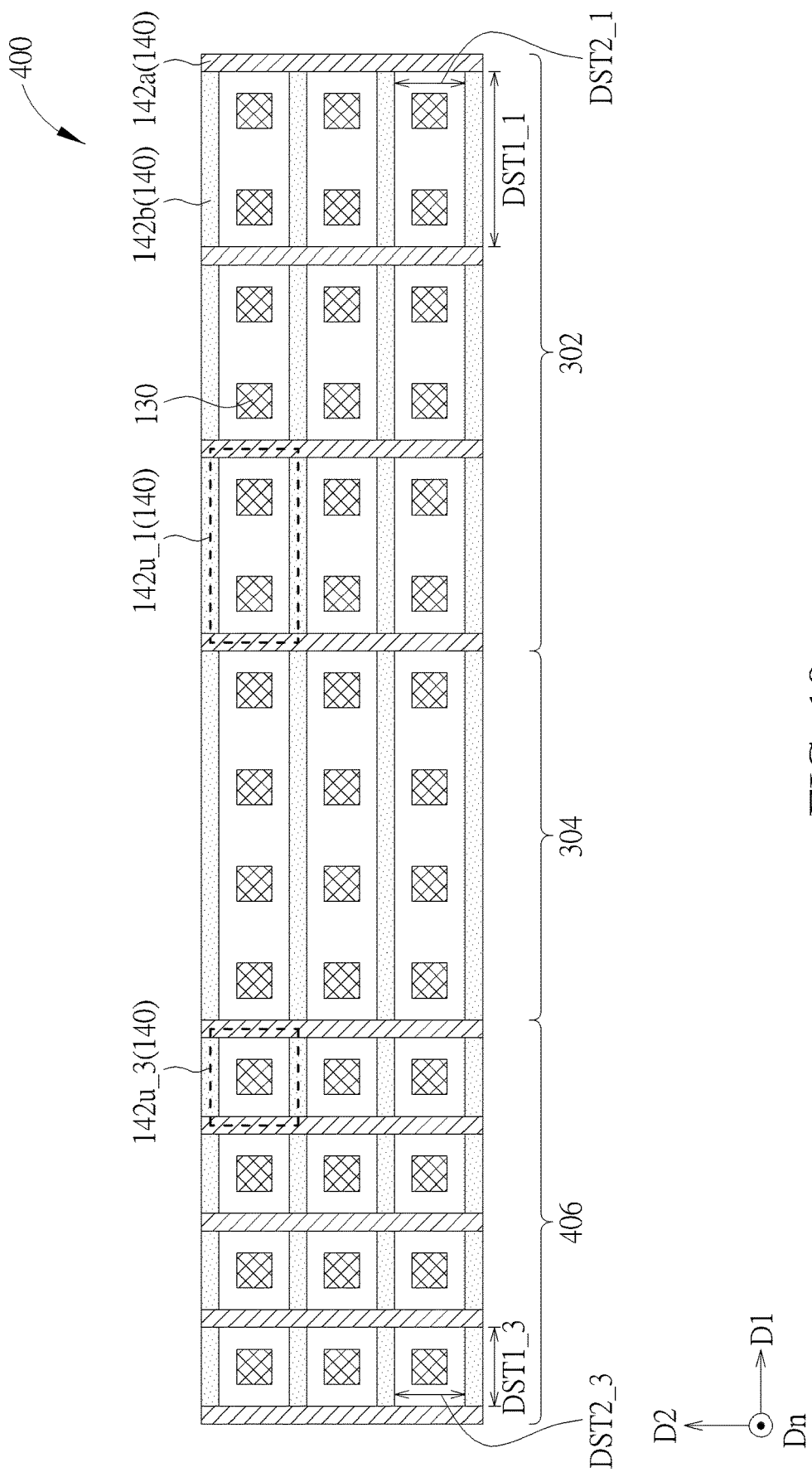
FIG. 10 is a schematic diagram showing a top view of a display device according to some embodiments of the present disclosure.

Referring to FIG. 10, FIG. 10 is a schematic diagram showing a top view of a display device according to some embodiments of the present disclosure. As shown in FIG. 10, the display device 400 of this embodiment may include a first region 302, a second region 304 and a third region 406, wherein the first region 302 and the third region 406 of the light controlling means 140 may include a plurality of first collimating walls 142a and a plurality of second collimating walls 142b, the second region 304 may include a plurality of second collimating walls 142b, and the second region 304 may not include the first collimating wall 142a, but not limited thereto. In FIG. 10, the collimating wall unit 142u_1 of the first region 302 surrounds two light emitting units 130, and the first distance DST1_1 is greater than the second distance DST2_1 in the collimating wall unit 142u_1 of the first region 302. The collimating wall unit 142u_3 of the third region 406 surrounds one light emitting unit 130, and the first distance DST1_3 may be the same as or different from the second distance DST2_3 in the collimating wall unit 142u_3 of the third region 406 (e.g., the first distance DST1_3 may be greater than the second distance DST2_3). The first distance DST1_1 of the collimating wall unit 142u_1 of the first region 302 is greater than the first distance DST1_3 of the collimating wall unit 142u_3 of the third region 406, but not limited thereto. Accordingly, in the first region 302 and the third region 406 shown in FIG. 10, the light controlling means 140 controls the route that the emitting light of the light emitting unit 130 moves in the horizontal direction D1 and the vertical direction D2; in the second region 304 shown in FIG. 10, because the second region 304 does not include the first collimating wall 142a, the second region 304 does not control the route that the emitting light of the light emitting unit 130 moves in the horizontal direction D1, such that the emitting light of the light emitting unit 130 may not be limited to moving at the first angle θ1 in the horizontal direction D1. Note that, since the first distance DST1_1 of the collimating wall unit 142u_1 of the first region 302 is greater than the first distance DST1_3 of the collimating wall unit 142u_3 of the third region 406, the first angle θ1 at which the emitting light of the light emitting unit 130 in the first region 302 moves in the horizontal direction D1 is greater than the first angle θ1 at which the emitting light of the light emitting unit 130 in the third region 406 moves in the horizontal direction D1.

For example, when the display device 400 shown in FIG. 10 is applied to the display device of the car, the first region 302 of this the display device 400 may serve as an infotainment display region in front of the front passenger, the second region 304 may have the function similar to the center informative display, and the third region 406 may be the instrument panel, such that the display device 400 may be a combination of the infotainment display in front of the front passenger, the center informative display and the instrument panel, but not limited thereto.

Moreover, in some embodiments (not shown in figures), the dispositions in the first region 302 and the third region 406 of the light controlling means 140 may be the same, but not limited thereto. In some embodiments (not shown in figures), the first region 302, the second region 304 and the third region 406 of the light controlling means 140 may be respectively designed to individually include the adjustable collimator(s) and/or the non-adjustable collimator(s) based on their requirement(s).

Figure 11:
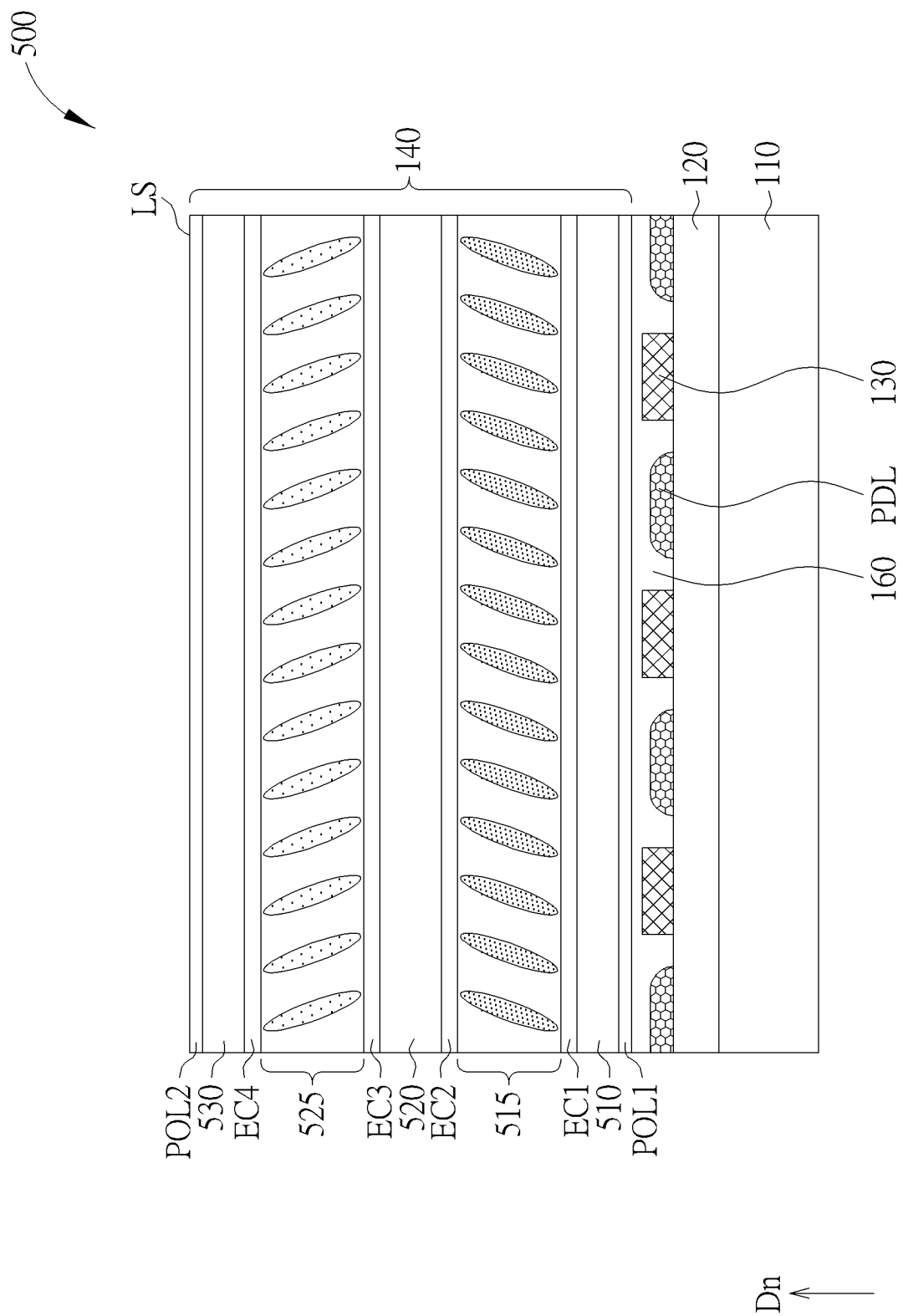
FIG. 11 is a schematic diagram showing a cross-sectional view of a display device according to some embodiments of the present disclosure.

Referring to FIG. 11, FIG. 11 is a schematic diagram showing a cross-sectional view of a display device according to some embodiments of the present disclosure. As shown in FIG. 11, the light controlling means 140 of the display device 500 of this embodiment may be an electrically controlled birefringence (ECB) component, wherein the light controlling means 140 may be disposed on the protecting layer 160, such that a bottom of the light controlling means 140 is higher than a top surface of the light emitting unit 130, but not limited thereto. In some embodiments, the light controlling means 140 may include a first polarizer POL1, a first light controlling substrate 510, a second polarizer POL2, a second light controlling substrate 520, a first controlling electrode EC1, a second controlling electrode EC2 and a first light controlling medium layer 515, wherein the first light controlling medium layer 515 is disposed between the first light controlling substrate 510 and the second light controlling substrate 520, the first controlling electrode EC1 is disposed between the first light controlling medium layer 515 and the first light controlling substrate 510, and the second controlling electrode EC2 is disposed between the first light controlling medium layer 515 and the second light controlling substrate 520, such that the light controlling means 140 is a ECB component having single light controlling medium layer, but not limited thereto. Note that the light controlling means 140 may control the first light controlling medium layer 515 by providing electrical signal(s) for the first controlling electrode EC1 and the second controlling electrode EC2. In some embodiments (as shown in FIG. 11), the light controlling means 140 may optionally include a third light controlling substrate 530, a third controlling electrode EC3, a fourth controlling electrode EC4 and a second light controlling medium layer 525, wherein the second light controlling substrate 520 is disposed between the first light controlling substrate 510 and the third light controlling substrate 530, the second light controlling medium layer 525 is disposed between the third light controlling substrate 530 and the second light controlling substrate 520, the third controlling electrode EC3 is disposed between the second light controlling medium layer 525 and the second light controlling substrate 520, and the fourth controlling electrode EC4 is disposed between the second light controlling medium layer 525 and the third light controlling substrate 530, such that the light controlling means 140 is a ECB component having two light controlling medium layers, but not limited thereto. Note that the light controlling means 140 may control the second light controlling medium layer 525 by providing electrical signal(s) for the third controlling electrode EC3 and the fourth controlling electrode EC4. Note that the light-emitting surface LS shown in FIG. 11 is an outer surface of the second polarizer POL2, but not limited thereto.

The first light controlling substrate 510, the second light controlling substrate 520 and the third light controlling substrate 530 may include glass, quartz, sapphire, PI, PET, other suitable materials or a combination thereof, so as to be a rigid substrate or a flexible substrate. The material of the first light controlling substrate 510, the material of the second light controlling substrate 520 and the material of the third light controlling substrate 530 may be the same or different. The first controlling electrode EC1, the second controlling electrode EC2, the third controlling electrode EC3 and the fourth controlling electrode EC4 may include transparent conductive material, such as indium tin oxide and/or indium zinc oxide, but not limited thereto. The first light controlling medium layer 515 and the second light controlling medium layer 525 may be any suitable electrically controlling medium layer, such as a liquid crystal layer, but not limited thereto.

The internal structure of the first light controlling medium layer 515 may be changed (e.g., the molecular rotation) based on the electrical signal(s) applied on the first controlling electrode EC1 and the second controlling electrode EC2, and the internal structure of the second light controlling medium layer 525 may be changed (e.g., the molecular rotation) based on the electrical signal(s) applied on the third controlling electrode EC3 and the fourth controlling electrode EC4. Therefore, the emitting light of the light emitting unit 130 which is incident on the first light controlling medium layer 515 (and the second light controlling medium layer 525) may be adjusted, such that the emitting light may move at the first angle $\theta 1$ in the horizontal direction D1 and move at the second angle $\theta 2$ in the vertical direction D2.

In summary, according to the design of the light controlling means of the display device of the present disclosure, the emitting light of the light emitting unit may be controlled to move at the first angle in the horizontal direction and at the second angle in the vertical direction through the light controlling means.

Although the embodiments and their advantages of the present disclosure have been described as above, it should be understood that any person having ordinary skill in the art can make changes, substitutions, and modifications without departing from the spirit and scope of the present disclosure. In addition, the protecting scope of the present disclosure is not limited to the processes, machines, manufactures, material compositions, devices, methods and steps in the specific embodiments described in the description. Any person having ordinary skill in the art can understand the current or future developed processes, machines, manufactures, material compositions, devices, methods and steps from the content of the present disclosure, and then, they can be used according to the present disclosure as long as the same functions can be implemented or the same results can be achieved in the embodiments described herein. Thus, the protecting scope of the present disclosure includes the above processes, machines, manufactures, material compositions, devices, methods and steps. Moreover, each claim constitutes an individual embodiment, and the protecting scope of the present disclosure also includes the combination of each claim and each embodiment. The protecting scope of the present disclosure shall be determined by the appended claims.

What is claimed is:
1. An electronic device, comprising:
a light emitting unit; and
a light controlling structure disposed on the light emitting unit, wherein an included angle of an emitting light of the light emitting unit which at least passes through the light controlling structure along a horizontal direction is greater than an included angle of the emitting light of the light emitting unit which at least passes through the light controlling structure along a vertical direction;

wherein the horizontal direction is defined as a direction parallel to a floor and the vertical direction is defined as a direction perpendicular to the floor;

wherein the light controlling structure is a non-adjustable collimator.

2. The electronic device according to claim 1, wherein the electronic device is disposed in a vehicle, the horizontal direction is defined as a direction parallel to a floor of the vehicle, and the vertical direction is defined as a direction perpendicular to the floor of the vehicle.

3. The electronic device according to claim 1, wherein the light emitting unit comprises a self-luminous type light emitting component.

4. The electronic device according to claim 1, wherein the light emitting unit comprises a portion of a backlight module.

5. The electronic device according to claim 1, wherein the light controlling structure comprises a plurality of collimating walls, and the plurality of collimating walls arrange in the vertical direction and extend along the horizontal direction.

6. The electronic device according to claim 1, wherein the light controlling structure comprises a plurality of collimating walls, one of the plurality of collimating walls has a first surface adjacent to the light emitting unit and a second surface opposite to the first surface, and a width of the first surface is greater than a width of the second surface.

\* \* \* \* \*